United States Patent
McFarland et al.

[15] 3,678,375
[45] July 18, 1972

[54] ELECTRONIC APPARATUS FOR ACCURATELY MONITORING AND RECORDING THE PARTIAL PRESSURE OF A GAS

[72] Inventors: Otho K. McFarland, Glencoe; James F. Tamburrino, Chicago, both of Ill.

[73] Assignee: Abbott Laboratories

[22] Filed: Sept. 24, 1969

[21] Appl. No.: 4,789

[52] U.S. Cl. ........................... 324/29, 204/195 P, 324/30 R
[51] Int. Cl. ..................................................... G01n 27/42
[58] Field of Search ............... 324/30, 130, 29; 204/195 P; 23/232 E, 254 E, 255 E

[56] References Cited

UNITED STATES PATENTS 2,795,756   6/1957   Jacobson .............................. 324/30

*Primary Examiner*—Michael J. Lynch
*Attorney*—Molinare, Allegretti, Newitt & Witcoff

[57] ABSTRACT

An electronic apparatus for continuously metering and recording the partial pressure of $CO_2$ including a voltage sensitive meter and recorder. The meter is adapted to receive and read voltage generated by an electrode representative of the partial pressure of $CO_2$ in a stream of liquid introduced to the electrode. The recorder is adapted to record the voltage output from the meter together with a compensating voltage or in the alternative to record a pre-determined voltage which may be set independently of the voltage output of the meter. Electronic circuitry allows the recorder to automatically monitor the electrode voltage together with a compensating voltage. The circuitry also allows the periodic recalibration of the voltage supplied to the recorder. The calibration and monitoring of the partial pressure of $CO_2$ may be done either manually or automatically. The electronic circuitry generally includes resistive networks, power supplies, time delay units, solenoid coils and associated relays.

5 Claims, 4 Drawing Figures

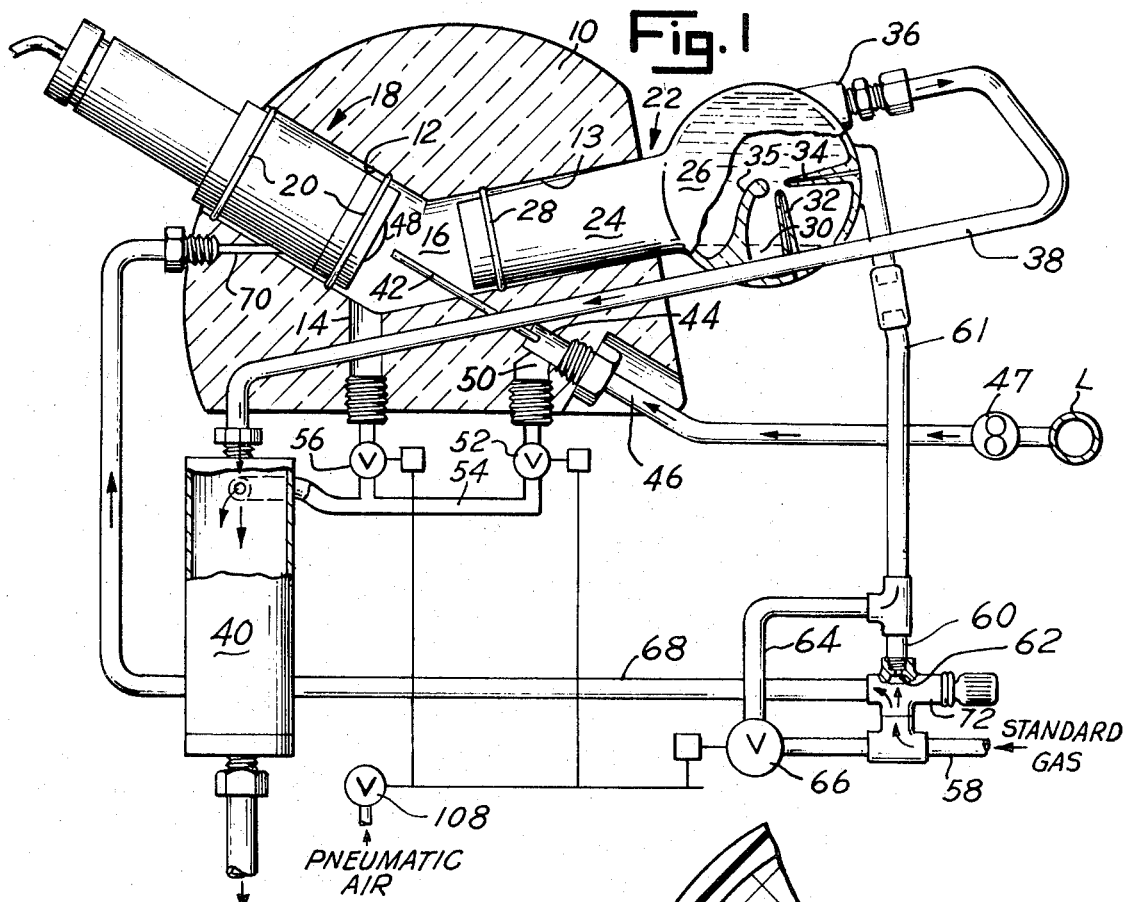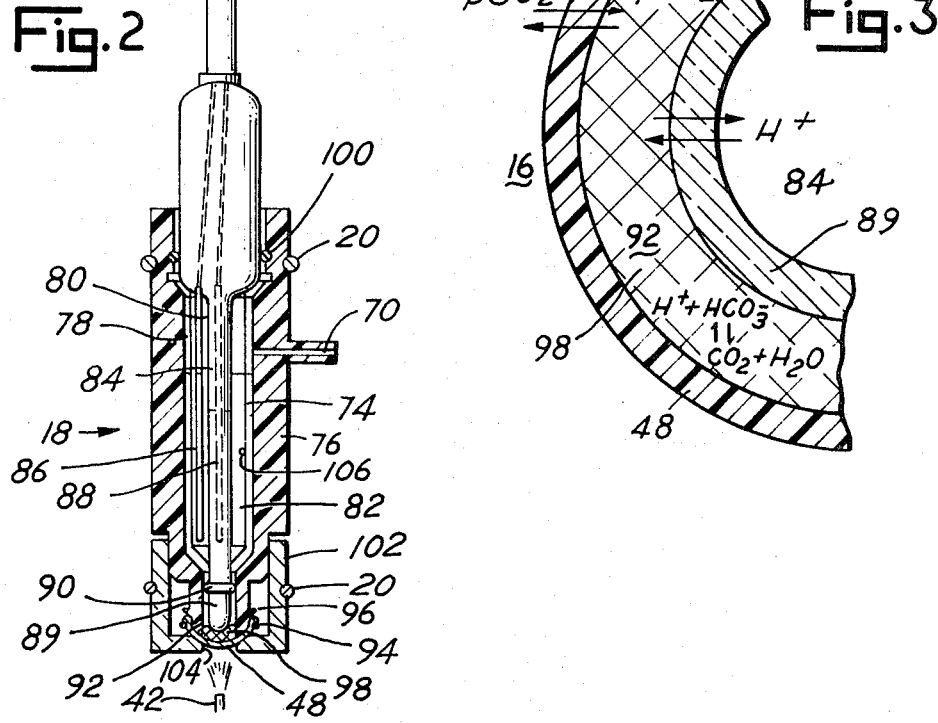

ELECTRONIC APPARATUS FOR ACCURATELY MONITORING AND RECORDING THE PARTIAL PRESSURE OF A GAS

BACKGROUND OF THE INVENTION

The electronic apparatus of applicants' invention has been constructed in order to provide a method for automatically standardizing and calibrating a sampling apparatus for monitoring the partial pressure of a gas. In a particular application, this circuitry was designed for use with an electrode for generating a voltage representative of the partial pressure of $CO_2$ in a liquid solution. However, according to the principals of applicants' invention, the circuitry disclosed would be easily employable for use with a standard electrode. For example, this circuitry could be applied in an electrode which generates a voltage representative of the concentration of hydrogen ions in a particular solution.

The electronic apparatus constructed in accordance with the principals of our invention provides means for continuously metering and recording the output of a sensing electrode accurately and efficiently. The electronic apparatus of our invention automatically standardizes and recalibrates the recorder at predetermined intervals. The electronic apparatus of our invention provide manually operable controls for standardizing and recalibrating the recorder at any desired time. Accordingly, the electronic apparatus of our invention substantially reduces the possibility of error in the readout of the electrode output by periodically recalibrating the recorder reading. The electronic circuitry of our invention also provides a recording of the error voltage from the electrode during the calibration of the recorder.

SUMMARY OF THE INVENTION

In one principal aspect, an electronic apparatus is provided for use with an ion sensing electrode comprising the combination of a readout device for recording a voltage impressed thereon having a voltage input terminal, means for automatically impressing a predetermined voltage representative of ion concentration of a standard solution on the input terminal, means for automatically storing a compensating voltage representative of the difference between the predetermined voltage and a voltage generated by the sensing electrode representative of the ion concentration of the standard solution, and means for automatically impressing the compensating voltage across the input in series with a sample voltage generated by the sensing electrode representative of the ion concentration of a sample solution such that the compensating voltage and the sample voltage in series are more truly representative of the ion concentration of the sample solution than is the sample voltage alone.

In another principal aspect, an improvement in electronic apparatus for continuously recording the voltage output of a sensing electrode representative of the partial pressure of a gas in a liquid solution is provided. The electronic apparatus for recording a voltage has a voltage input terminal, a moveable sheet for recording thereon, and a recorder pen responsive to the voltage impressed on the input terminal. The improvement comprises means for automatically impressing a predetermined voltage representative of the partial pressure of a standardized gas on the input terminal, means for automatically storing a compensating voltage representative of the difference between the predetermined voltage and the voltage generated by the electrode means representative of the partial pressure of the standardized gas, and means for automatically impressing the compensating voltage across the input in series with a sample voltage generated by the electrode representative of the partial pressure of a gas in sample liquid solution such that the compensating voltage and the sample voltage in series are more truly representative of the partial pressure of the gas in the sample liquid solution than is the sample voltage alone.

In still another principal aspect, an improvement in an electronic apparatus for continuously monitoring the voltage output of a sensing electrode representative of the partial pressure of a sample gas in a liquid solution having a voltage input terminal and recorder means for responding to the voltage impressed on the input terminal. The improvement comprises automatic switching means for impressing a compensating voltage across the input terminal in series with the sample voltage generated by the electrode when the sample solution is introduced to the input of the electrode, sample measuring timer means for breaking a contact after a predetermined sample measuring time, electrode input solenoid means responsive to the breaking of the contact for alternating the input of the electrode from the sample solution to a standarized gas the partial pressure of which is known, standard measuring timer means responsive to the breaking of the contact for breaking a second contact after a second predetermined time after the breaking of the first contact, calibration means responsive to the breaking of the second contact for switching the input of the recorder from the electrode voltage output to a predetermined voltage representative of the partial pressure of the standardized gas, means responsive to the breaking of the second contact for deactivating the electrode input solenoid after a third predetermined time after the breaking of the second contact such that the electrode input is alternated from the standardized gas to the sample solution, means responsive to the breaking of the second contact for switching the input of the recorder from the predetermined voltage to the electrode voltage and the compensating voltage in series, and means responsive to the breaking of the second contact for actuating the sample measuring timer means.

BRIEF DESCRIPTION OF THE DRAWINGS

In the course of this description, reference will frequently be made to the attached drawings in which:

FIG. 1 is an elevation partial cross-sectioned view of a preferred embodiment of gas partial pressure sampling assembly.

FIG. 2 is an enlarged partially cross-sectioned view of the sensing electrode of the sampling assembly.

FIG. 3 is a schematic presentation of operation of the sensing electrode of the sampling assembly.

DESCRIPTION OF THE PREFERRED EMBODIMENT

The Sampling Assembly

Figure 4:
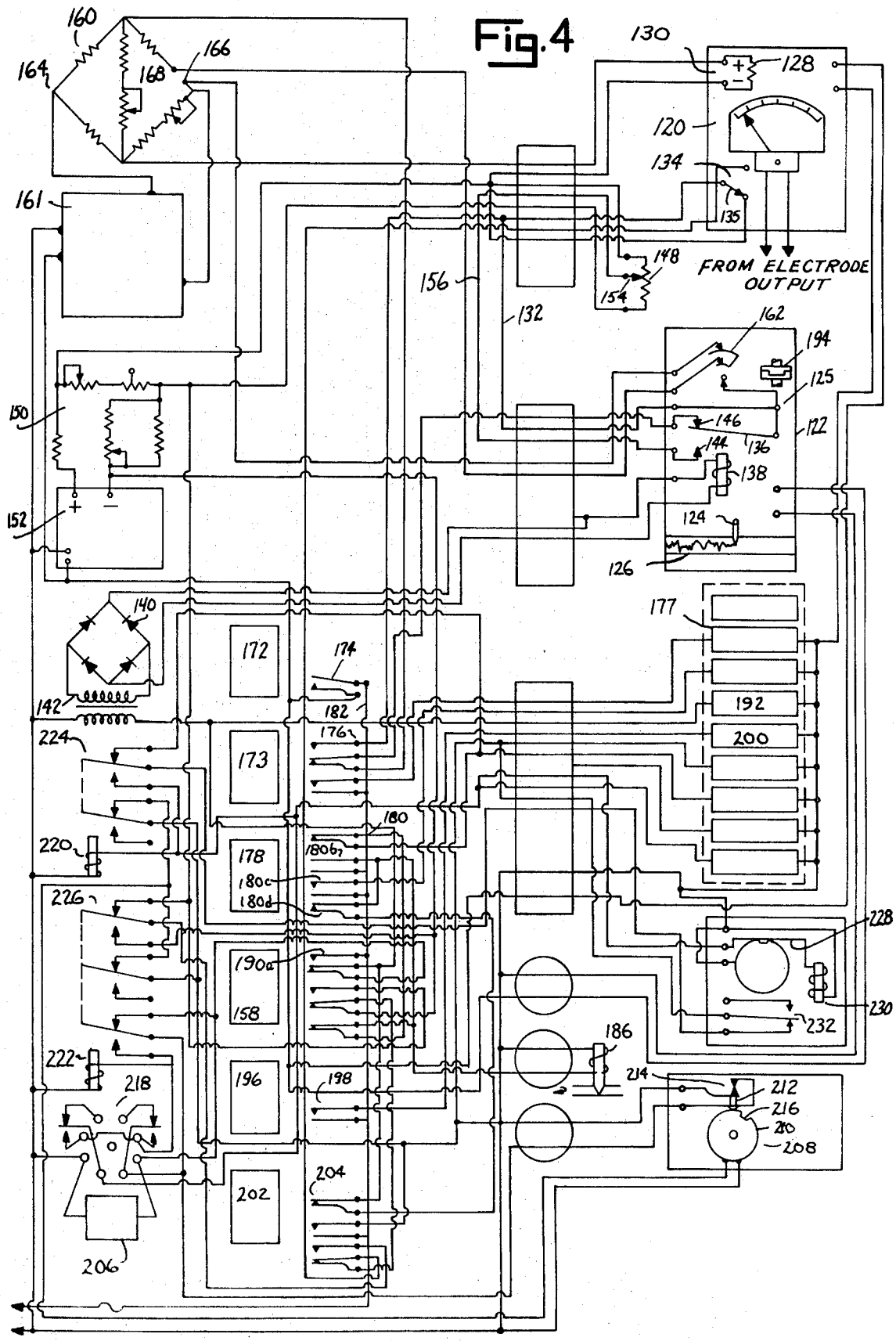
FIG. 4 is a circuit diagram showing the preferred embodiment of the electronic apparatus of our invention.

In FIG. 1, a preferred embodiment of the overall sampling assembly is shown which includes a housing block 10, formed of a suitable transparent material such as lucite. The block 10 has a plurality of major bores 12, 13 and 14 formed therein which extend from the exterior of the block and meet at one end to form a sampling chamber or cavity 16. An ion sensitive pH electrode, generally 18, is positioned in bore 12 and provided with suitable O-rings 20 to prevent leakage past the electrode from the cavity 16 to the exterior of the block. The specific details, principles of operation and modifications of the electrode will be outlined in more detail later.

Positioned in bore 13 is a nebulizer, generally 22, for calibrating the electrode periodically during operation. The nebulizer 22 includes a tubular neck 24 which communicates with a chamber 26 and an O-ring 28 is provided about the sampling cavity end of the neck 28 to prevent leakage from the cavity 16 between the neck and the bore 13. The neck communicates with terminates in the enlarged bulbous nebulizing chamber 26, a portion of the chamber being positioned beneath the neck so as to provide a sump 30 for holding a portion of liquid when the cavity 16 is drained. A liquid aspiration conduit 32 communicates at one end with the sump 30 and the other discharge end is positioned adjacent the discharge end of a gas inlet conduit 34 which is connected to a supply of standard carbon dioxide gas. A spray diffuser 35 is also positioned adjacent the discharge ends of conduits 32 and 34 to assist in forming a uniform vapor atmosphere during the calibration operation which will be described in more detail later. Positioned in the upper portion of the chamber 26 is an overflow discharge outlet 36 which communicates with a drain conduit 38 connected at the other end to a waste manifold 40. The discharge outlet 36 is positioned at the top of the chamber so as to maintain the sample cavity 16, tubular neck 24 and a major portion of the nebulizer chamber 26 continuously full of the liquid being sampled during the monitoring operation.

A small bore impinger 42 is positioned in a bore 44 of block 10 and communicates at one end with a sample inlet conduit 46 which is connected to a production flow line or the like L and a suitable continuously operating constant delivery peristaltic pump 47 continually diverts and delivers a small continuous portion of flow from flow line L to the impinger for injection into the cavity 16. The other end of the impinger 42 is positioned closely adjacent a membrane 48 which covers the end of the electrode 18 such that the fluid stream issuing from the end of the impinger 42 gently plays upon the membrane.

A bypass bore 50 is provided in the housing for diverting the sample inlet stream from the impinger 42 to the waste manifold 40 through a drain conduit 54 and a bypass valve 52, which is preferably pneumatically actuated. A drain valve 56, which is also pneumatically actuated, is also provided which communicates with bore 14 for draining the cavity 16 through the drain conduit 54 to manifold 40.

A carbon dioxide standard gas piping arrangement is provided which includes a main conduit 58 which is adapted to be connected to a source of standard carbon dioxide gas at a given pressure. A branch conduit 60 connects the main 58 with the gas inlet conduit 34 to the nebulizer 22 through gas line 61. A small orifice 62 is provided in the branch 60 to maintain a small flow of standard gas to the nebulizer at all times during the monitoring cycle. Such flow maintains the liquid which substantially fills the nebulizer chamber 26 in a slightly agitated state and prevents clogging of the relatively small discharge apertures in the ends of conduits 32 and 34 and the accumulation of stale liquid in sump 30. A second branch conduit 64 extends from the main 58 through a pneumatically actuated valve 66 and is connected to the gas line 61 in bypassing relationship to the orifice 62 for introducing the standard carbon dioxide at an increased flow rate to the nebulizer during the calibration stage which will be described in more detail later. A third conduit 68 extends from the main 58 to a relatively small injection bore 70 for feeding the standard carbon dioxide gas to the electrode 18, the construction and purpose of which will be described in more detail later. The flow through conduit 68 is metered by a metering valve 72.

The Electrode

Referring to FIGS. 2 and 3, the electrode 18 is a pH glass electrode which is constructed to signal the pH of a thin film of aqueous sodium bicarbonate buffer solution. The electrode includes a generally cylindrical elongated tubular glass element 74 which is surrounded by a tubular concentric jacket 76 which is formed of stainless steel or other suitable strong material and which forms a housing for the electrode. The inner diameter of the jacket 76 is somewhat greater than the diameter of the glass element 74 so as to provide an annular recess 78 which acts as a reservoir of sodium bicarbonate buffer solution. Still another elongated tubular cylindrical glass element 80 is concentrically positioned within element 74 and is sealed therefrom, the space between the outer wall of element 80 and the inner wall of element 74 forming a first annular reference electrode chamber 82 and the interior of element 80 defines a second sensing electrode chamber 84. Each of the chambers 82 and 84 is filled with a KCl electrolyte solution of approximately 0.1 M, and a mercury amalgam reference electrode 86, such as a calomel electrode is positioned in the electrolyte in chamber 82 and a calomel sensing electrode 88 is positioned in the electrolyte in the sensing chamber 84.

The end of element 80 extends beyond element 74 at 89 and an O-ring 90 is positioned about the extended end to form an operating chamber 92 at the extended end 89 and separates the chamber 92 from the buffer solution reservoir 78. The open of the jacket 76 is covered with the membrane 48, the membrane being permeable to the gas which is to be measured, in this instance carbon dioxide. The membrane is preferably formed of a thin Teflon film which allows the passage of carbon dioxide, but which prevents the passage of any other molecules which might adversely alter the pH of the buffer solution. The membrane 48 is sealingly secured by a suitable means to the end of the jacket 76, such as by an elastic band 94 which cooperates with an annular notch 96 in the end of the jacket. A thin layer of nylon mesh or grid 98 is packed between the membrane 48 and the tip of the extended glass sensing element 89 and the mesh is saturated with the sodium bicarbonate buffer solution. The O-ring 90 substantially seals the operating chamber 92 from the bicarbonate buffer solution reservoir 78, but allows a slight transfer of the buffer solution back and forth to maintain the buffer in the operating chamber in a replenished and steady state.

An O-ring 100 is provided at the other enlarged end of glass element 74 to prevent leakage from the reservoir 78 to the exterior of the electrode. A cap member 102 is fitted over the end of the jacket and the membrane 48 is exposed through an aperture 104 in the cap.

The electrode thus far described is basically a Severinghaus $CO_2$ cell which is obtainable from Instrumentation Laboratories, Boston, Massachusetts. Severinghaus electrodes have been used in the past primarily for batch pH measurements and are generally unacceptable as such for the continuous online monitor which is contemplated by our invention, due to rapid and excessive drift. Such drift apparently results from a migration of bicarbonate ions between the operating chamber 92 and the reservoir 78, and since the diffusion rate past the O-ring 90 never reaches a steady state, a long-term drift in electrode potential results. It has been found that this drift in the Severinghaus electrode can be prevented by continuously bleeding a small amount of gas of a fixed carbon dioxide content into the reservoir 78. The presence of the gas in the reservoir tends to stabilize the carbon dioxide partial pressure in the buffer solution and maintains a steady stage diffusion between the operating chamber 92 of the electrode and reservoir. The bleed rate may be adjusted by the metering valve 72.

Description of Operation of the Sampling Assembly During Monitoring

At the commencement of monitoring of the intravenous solution bypass valve 52, drain valve 56, and nebulizer gas valve 66 are closed and a small portion of the production liquid intravenous stream is continuously diverted from the production flow line L by pump 47 and passes through the sample inlet conduit 46, through bore 44 and through the impinger 42, discharging against the sampling cavity side of the Teflon membrane 48 of the electrode 18. The carbon dioxide, the partial pressure of which is to be measured, has been previously mixed into the intravenous liquid passing through line L. Therefore, the sample portion which is diverted from line L and passed to the sampling cavity is of substantially the same gas content as the main stream.

Since the drain valve 56 is closed, the sample flowing through the impinger 42 will collect in cavity 16 and fill the sampling cavity and the neck 24 and a major portion of the chamber 26 of the nebulizer, the level in the chamber 26 being fixed by overflowing at outlet 36 and passing through drain conduit 38 to waste manifold 40.

When the cavity 16 is full, the membrane 48 is completely contacted by the body of liquid in the cavity and the impinger directs its stream into the body of liquid. In actuality, the stream flowing from the impinger 42 does not actually impact the membrane 48 as such, but is injected into the body of liquid in such a manner that the stream reaches the membrane in a substantially non-pressurized state and continuously supplies the membrane with fresh sample liquid at all times displacing away from the membrane 48 the fluid which has just previously been monitored. The discharge rate of the impinger 42 and the distance between the impinger tip and the membrane should be adjusted such that the stream issuing from the tip of the impinger into the body of liquid just falls short of pressurized impact on a membrane since increased impact pressure on the membrane will result in increased diffusion of carbon dioxide across the membrane and provide erroneous partial pressure readings as will become evident when considering the description of the electrode operation which will be described in more detail later. The flow rate and impinger-to-membrane distance may be readily determined by one of ordinary skill in the art when he considers the requirement of avoiding pressurized impact. Since the impinger 42 continuously supplies the membrane 48 with fresh sample intravenous solution and sweeps away liquid from the surface of the membrane which has already been analyzed, and since the cavity 16 is maintained completely filled at all times during the measuring operation, the likelihood of erroneous readings due to the presence of gas bubbles and stale liquid is substantially reduced, if not eliminated altogether, such being a necessity in the continuous monitoring operation contemplated.

Referring particularly to FIGS. 2 and 3, as the intravenous liquid with the inert carbon dioxide gas suspended therein contacts the Teflon membrane 48, a certain amount of the carbon dioxide diffuses through the membrane either from or to the operating chamber 92 and the sodium bicarbonate buffer solution contained therein. The amount of carbon dioxide which diffuses through the membrane will depend upon the bicarbonate ion concentration in the buffer solution and the amount, and hence the partial pressure, of carbon dioxide which is carried by the intravenous solution. For a given buffer concentration if the partial pressure of the carbon dioxide is relatively high, carbon dioxide will tend to diffuse through the membrane from the cavity 16 to the buffer solution. Such addition of carbon dioxide will drive the ion equilibrium equation in one direction such that the $H^+$ ion concentration in the sensing chamber will increase. Since the tip of the glass element 89 is permeable to $H^+$ ions, the increase in $H^+$ ion concentration will tend to cause $H^+$ ions to diffuse from the solution in chamber 92 to the electrolyte in the sensing electrode chamber 84 to change the potential of the cell in the manner comparable to a conventional standard pH electrode. On the other hand, if the partial pressure of the carbon dioxide in the cavity is low, carbon dioxide will tend to diffuse through the membrane from the buffer solution to the cavity 16 driving the equilibrium equation in the opposite direction, reducing the $H^+$ ion concentration in the buffer solution and effecting a diffusion of $H^+$ ions from the electrolyte to the buffer solution.

The nylon mesh 98 tends to maintain the buffer solution in continuous contact with both the tip 89 of the extended end of the glass electrode and the Teflon membrane 48 and allows steady state equilibrium to be attained more rapidly. The mesh is maintained in a saturated condition by the reservoir 78 to bicarbonate solution and acts as a salt junction between the measuring tip 89 and the reference electrode 86 via a tiny aperture 106 in element 74 which communicated between reservoir 78 and the reference electrode chamber 82.

The buffer solution is preferably selected to be of a concentration such that the electrical output of the electrode is approximately 56 millivolts for each 10-fold change in the partial pressure of the carbon dioxide. A suitable buffer solution may be obtained from Instrumentation Laboratory, Inc., Boston, Mass. as their solution No. 106-22. When such solution is used, the pH of the buffer solution has been found to fall about 1 pH unit for each ten-fold increase in $pCO_2$, Thus providing a Ph variation which is a linear function of the logarithm of $pCO_2$.

During the measuring cycle of the monitor, a standard carbon dioxide gas is continuously fed through metering valve 72 to reservoir 78 and also fed through the orifice 62 to the gas inlet conduit 34 of the nebulizer 22 for the reasons previously described. The flow to the reservoir 78 is only slight and is just enough to maintain the buffer saturated without pressurizing the reservoir to any appreciable extent. The flow through the tip of the inlet 34 is also small and no atomization if fluid occurs since the nebulizer chamber 26 is maintained substantially filled at all times during the monitoring operation.

Description of Operation of the Sampling Assembly During Calibration

Although the bleed of carbon dioxide into reservoir 78 substantially reduces drift in the electrode, some drift will occur over an extended time. For this reason the readout circuit should be periodically recalibrated to prevent erroneous readings caused by long term drift. A suitable control valve 108 is opened periodically to introduce working air to valves 52, 56 and 66 to open the valves simultaneously. Opening of valve 108 may be automatically controlled by a timer if desired. When drain valve 56 is opened, the liquid which fills the cavity 16 and the nebulizer chamber 26 is drained to the drain conduit 54 and into waste manifold 40, with the exception of a small portion of the liquid remaining in the sump 30 in nebulizer chamber, the level being shown by the dotted line in FIG. 1. The opening of the bypass valve 52 diverts the sample stream from the impinger 42 to the drain conduit 54 and the waste mainfold and the sample stream thereby ceases to issue into the cavity 16 from the impinger. When valve 66 is opened, the standard carbon dioxide gas bypasses the orifice 62 and is introduced directly into gas line 61 and flows to the nebulizer inlet conduit 34. The increased flow of gas across the tip of the liquid aspirator 32 reduces the pressure at the tip drawing liquid from the sump 30 and atomizing the liquid to produce a mixture of standard carbon dioxide and liquid in the form of a gas equilibrated cloud. The cloud fills the nebulizer chamber 26, and the cavity 16 and is "seen" by the membrane 48, a selected portion of the carbon dioxide gas in the cloud diffusing through the membrane to produce an electrode signal in a manner similar to that previously described. This signal may be readily compared with what the output signal should be for the given standard gas partial pressure and the signal may be compensated for accordingly as necessary.

The standard gas mixture should preferably have a $pCO_2$ exceeding that of the intravenous solution which is to be monitored for optimum response, since the solution drawn from the sump will tend to contribute somewhat to the partial pressure of the cloud which is seen by the membrane and a longer equilibration time will be required for calibration. It has been found that a flow rate of standard carbon dioxide from the gas inlet 34 of approximately 1500 cc/min. is sufficient to produce the gas cloud desired while avoiding excessive use of the standard gas mixture and any cooling effect which might be brought about due to the expansion of the gas. A 100 percent carbon dioxide standard gas is preferred at 21° C and 14.7 psia to insure adequate aspiration of all intravenous solutions.

Although the liquid used in the formation of the calibration cloud has been described as being the intravenous liquid which has been left in the sump, water may also be nebulized for long continuous calibration periods without a fall off in the partial pressure of water as might be experienced due to evaporation after a substantially lengthy calibration step with a salt solution or a heavy loaded intravenous solution. The use of water is not generally necessary however, since with the apparatus and method described, only a few minutes will usually be required in most circumstances to reach equilibrium during calibration.

Electronic Circuitry

According to the principles of applicant's invention the partial pressure of the $CO_2$ may be monitored by a meter 120 and a recorder 122. As has been explained, the electrode 18 generates a voltage representative of the partial pressure of a gas. The meter 120 is a common volt meter of the type well known in the art, such as a Leads and Northrup Model 7407 having a full scale reading at 200 millivolts representing a two decade change from the sensing electrode. This meter 120 is capable of recording changes from 10 to 1,000 mm Hg p $CO_2$.

The recorder 122 is of the type commonly known in the art, having a stylus recording pen 124 responsive to the voltage impressed on the input 125 of the recorder. The recorder sheet 126 on which the pen 124 records may be driven by a two speed motor (not shown). The recorder selected for this particular embodiment was one of the type known as a Leads and Northrup Speedomax W recorder having a 100 millivolt full scale input sensitivity. Because of the sensitivity differences between the meter and the recorder, a 200 ohm precision resistor 128 was connected in parallel with the recorder output terminals 130. The output of the meter is delivered to the recorder through conductor 132 by a single pole double throw rotary switch 134 for changing the recorder scale from 10–100 mm Hg p $CO_2$ to 100–1,000 mm Hg p $CO_2$. This single pole double throw rotary switch 134 allows the meter to read its normal two decade scale and provides a manually operable method by which the recorder may register either of the two expanded scales by merely alternating the switch 134. The recorder is provided with a recorder input switch 136 which may be activated by a recorder solenoid 138 for alternating the input to the recorder 122. The recorder solenoid 138 is energized by power delivered through a diode bridge 140 from a 100 volt to 24 volt transformer 142. Thus, whenever power is delivered to the transformer 142, the solenoid 138 is energized and the recorder input switch 136 is depressed to make contact with immobile terminal 144. When no power is supplied to the transformer 142, the switch returns to its normal position in contact with upper immovable terminal 146.

As has been previously mentioned, there is inherent error in a reading taken directly from the electrode 18. Thus a method of automatically calibrating the recorder has been devised according to the principles of the invention. To provide a predetermined voltage for the calibration of the recorder, a 10-turn 100 ohm micrometer 148 has been placed in parallel with the output resistive network 150 of a DC power supply 152 of the type commonly known in the art. The power supply may take the form of a Leads and Northrup Regulated Power Supply Part No. 099012 having a rating of 1.050 volts at 10 milliamps for a fixed resistive load of 105 ohms. The 100 ohm micrometer 148 has a manually adjustable microdial 154 for dividing the fixed voltage across the micrometer 148 and delivering a portion of the voltage through conductor 156 to the lower immovable terminal 144 of the recorder input switch 136. Thus whenever the recorder solenoid 138 is activated, the single pole double throw switch 134 is in contact with the lower movable terminal 144 and a predetermined voltage set by the microdial 154 is impressed across the recorder input 125. As will be further explained, the depression of the calibrate button 158 supplies power to the transformer 142 which actuates solenoid 138 and causes the predetermined voltage to be impressed across the recorder input 125.

A compensating voltage in series with the meter output from the movable arm 135 of the switch 134 may be produced by a resistive bridge network 160 having power supplied to it by a solid state DC power supply 161 of the type commonly known in the art. The resistive bridge may be of the type commonly called a Wheatstone bridge having an adjustable restandardizing slide wire resistor 162 in series connection in one arm of the bridge. The DC power supply should be connected to the two terminals 164 and 166 not connected across the bridge arm 168.

The bridge arm 168 is series connected to the output of the meter 120. Thus the voltage across the bridge arm 168 causes a change in the voltage across the recorder input 125 when the recorder input switch 136 is connected to the output of meter 120.

Description Of Operation Of The Electronic Metering And Recording System

For the operation of the system, control buttons with associated control lamps are provided. Thus when the off button 172 is depressed, switch 174 is open and no power is served to any component in the system. The power which may be served to the basic components is of the type commonly obtainable from a standard household outlet having 110 volt 60 cycle per second current.

When the standby button 173 is depressed switch 174 closes and double pole double throw standby switch 176 is moved into contact with upper immovable contacts of the switch 176. The alteration of these switches causes power to be served to the recorder 122 and the meter 120 with the recorder input shorted out through the upper moveable contact of the double pole double throw switch 176, thus holding the recorder pen 124 at the zero position. The recording sheet 126 may be set in motion through independent control of the recorder sheet motor (not shown). The standby switch 176 also activates the standby light 177 through lower moveable contact of switch 176.

Depression of the standard button 178 causes the standby switch 176 to return to its normal position in contact with lower immovable member of the contact switch. It also causes the four movable contact members of the standard switch 180 to move out of their normal position and into contact with the upper immovable contact members of the standard switch 180.

Thus power may be served from power line 182 through immovable contact 180c to standard light 184 and through immovable contact 180b to a control valve solenoid 186. When the control valve solenoid 186 is energized, the control valve 108, is opened and, as has been described, working air is introduced to valves 52, 56 and 66 which cause the substitution of the sample liquid solution having a gas the partial pressure of which is to be determined for a standardized gas the partial pressure of which is known. Thus, with the standard button 178 depressed, a standard gas is introduced to the electrode 18 and the recorder input 125, no longer shorted by standby switch 176, receives the meter output representative of the voltage generated by the electrode 18. In this mode the recorder 122 and meter 120 may be observed to follow a change in reading over a period of time ultimately reaching an equilibrium position.

Having reached the equilibrium position the calibrate button 158 may be depressed. Depression of calibrate button 158 causes the movable contact members of standard switch 180 to return to normal position in contact with lower immovable contact members. The depression of the calibrate button 158 also causes the moveable members of double throw calibrate switch 190 to be moved into contact with upper immovable contact members of the calibrate switch 190. In the calibrate mode the control valve solenoid 186 remains energized through standard switch immovable contact member 180d and through immovable contact member 190a of calibrate switch 190. Also the transformer 142 is energized by connection to power line 182 through upper immovable member 190a of calibrate switch 190. The energizing of the transformer 142 also serves power to calibrate light 192 and activates the recorder solenoid 138 through the diode bridge 140. Thus the voltage impressed across the recorder input is a predetermined voltage from the 100 ohm micrometer 148 set by the adjustment of the microdial 154.

In practice this predetermined voltage is mathematically respresentative of the partial pressure of the gas in the standard solution introduced to the electrode for calibration. The partial pressure of the standard gas is easily determinable because the analyzed percentage of the gas in the standard solution used is known. Thus for example where the gas introduced is 100 percent $CO_2$ at 744 mm Hg atmospheric pressure in contact with water at room temperature, the gas would have a partial pressure of 720 mm Hg where the water vapor at 25° C would have a partial pressure of 24 mm Hg. On a zero to 100 scale representing 1-log cycle from 100 to 1,000 mm Hg, 720 mm Hg would be approximately 85. Thus the microdial 154 should be set to 85, causing the recorder pen 124 to be driven at the 85 percent chart position.

The depression of the calibrate button 158 also activates a clutch 194 which is mechanically linked to the recorder solenoid 138. The variable slide wire resistor 162 is clutch connected to the recorder slide wire spindle. Thus when the predetermined voltage from the 100 ohm micrometer 148 is impressed across the recorder input through the recorder input switch 136, the slide wire is positioned by the clutch 94 to provide a compensating voltage across the bridge arm 168 of the resistive bridge network 160.

During the initial standardization and calibration, this compensating voltage should be zero as the recorder value in the standard mode (where a standardized gas is introduced to the electrode) is the same as the recorder value in the calibrate mode (where the recorder reads a portion of the voltage across the 100 ohm micrometer 148). Thereafter, the compensating voltage is so adjusted tat the exact potential is introduced into the meter output to retain the recorder pen 124 at the same position maintained when the predetermined voltage is impressed on the input of the recorder 122.

The depression of the measure button 196 causes the movable contacts of calibrate switch 190 to return to normal position in contact with the lower immovable contact members of the calibrate switch 190. Thus the control valve solenoid 186 is no longer energized through the upper immovable contact member 190a of calibrate switch 190. As has been described the control valve 108 thus returns to its normal position allowing valves 52, 56 and 66 to close simultaneously and cause the introduction of the sample solution having a gas, the partial pressure of which is to be determined, into the electrode 18. The measure contact switch 198 is made when the measure button 196 is depressed thus activating the measure light 200.

In the measure mode the meter and recorder sense the output of the electrode in response to the partial pressure of the gas in the sample solution, The recorder however follows this voltage with the compensating voltage produced by the bridge arm 168 of the resistive bridge network 160.

Description Of Automatic Operation Of The Meter And Recorder System

After equilibrium position has been reached in the standard mode the automatic button 202 may be depressed. Depression of the automatic button 202 causes the movable contact members of the standard switch 180 to be depressed into their normal position in contact with lower immovable contact members of the switch 180. The depression of the automatic button 202 also causes the movable contact members of the automatic switch 204 to move into contact with upper immovable contact members of the switch 204.

The depression of the automatic button 202 activates a time delay relay 206 capable of generating a wave for a predetermined time adjustable from zero to 30 seconds. This delayed timer may take the form of a solid state electronic switching device Guardian type TDO-62C3-115A. For example the delay timer may generate a square wave pulse for a duration equal to the predetermined time set on the delay timer relay 206. During This predetermined time the control valve solenoid 186 remains open for calibration and the power delivered by the time delay relay 206 activates the transformer 142 for switching the recorder input switch 136 to the lower immovable terminal 144, thus impressing the predetermined voltage from the 100 ohm micrometer 148 into the recorder input. An indication may thus be made of the calibration on the chart and the standardizing timer 208 may initiate its timing cycle.

The standardizing timer 208 may take the form of a fixed speed motor (not shown) drivingly connected to a disc 210. A switch lever 212 rides on the surface of the rotating disc 210 and causes the switch 214, normally in the made position, to break contact when the switch lever rides into a depression 216 in the disc 210. Thus the contact of switch 214 is broken whenever the motor (not shown) drives the disc 210 through a full revolution.

At the termination of the predetermined time duration of the pulse generated by the time delay timer 206, the double pole throw switch 218 of the time delay timer 206 is activated and the moving members of the switch 218 move out of normal position into contact with lower immovable members of the switch 218. This contact activates automatic relay solenoids 220 and 222 causing the double pole double throw relay switch 224 to be moved out of its normal position into contact with the lower immovable contact members of the switch 224 and causing double throw relay switch 226 to be moved out of normal position into contact with the lower immovable contact members of switch 226.

The switching relay switches 224 and 226 causes the deactivation of transformer 142 and thus a return of the recorder input switch 136 to its normal position in contact with the upper immovable terminal 146 of the recorder input switch 136 so that the input to the recorder 122 is the series combination of the voltage produced by the electrode 18 in series with the bridge voltage across the bridge arm 168 of the resistive bridge network 160.

The activation of relay switches 224 and 226 also energized the sample timer device 228. The sample timer may be a fixed slow speed motor timer of the type commonly known in the art. Associated with the sample timer 228 is a solenoid 230 which is energized by the expiration of one revolution of the sampler timer 228. The energized solenoid causes a timer switch 232 to be moved from its normal contact with the lower immovable terminal of the timer switch 232 into contact with the upper immovable terminal, thus interrupting power to solenoid 220 and allowing the return of double pole double throw relay switch 224 to its normal position in contact with the upper immovable contacts of the switch 224.

The momentary opening of timer 232 stops the sample timer 228 and initiates operation of the standardizing timer 208 and energizes the control valve solenoid 186 which, as has been described before, causes the replacement of the sample solution in the electrode 18 by a standardized gas. The standardizing mode into which the monitor has been placed is terminated by the opening of the standardizing timer switch 214 as has been described. This action renews the calibration cycle by interrupting power to automatic relay 22 which allows the switch 226 to return to its normal position having moveable contact members in contact with the upper immovable contact members of the switch 226.

In its normal position switch 226 energized the time delay relay 206 while permitting the control valve solenoid 186 to remain open and the standardizing timer 208 to continue turning until the actuation of the time delay relay switch 218 of the time delay relay 206. Finally, the actuation of the time delay relay 206 energizes automatic relays 220 and 222 and deenergizes the control valve solenoid 186. The monitor is once again in the on-stream mode and may thus perform another complete cycle.

We claim:

1. In an electronic apparatus for use with an ion sensing electrode, the combination of:
   a readout means for recording a voltage impressed thereon having a voltage input terminal;
   valve control means for selectively introducing either a standard solution or a sample solution to said electrode;
   standardizing means for simultaneously operating said valve control means to selectively introduce said standard solution to said electrode and impressing an output voltage from said electrode on said input terminal;

calibrating means for automatically impressing a pre-determined voltage representative of the ion concentration of the standard solution on said input terminal, means responsive to said calibrating means for automatically storing a compensating voltage representative of the difference between said pre-determined voltage and the voltage generated by the sensing electrode representative of the ion concentration of the standard solution, measuring means for selectively terminating said pre-determined voltage at said input terminal and automatically impressing said compensating voltage across said input terminal in series with an electrode voltage generated by the sensing electrode representative of the ion concentration of a solution such that said compensating voltage and said electrode voltage in series are more truly representative of the ion concentration of the solution than is the electrode voltage alone, and means responsive to said measuring means for operating said valve control means to selectively introduce only said sample solution to said electrode.

2. In an electronic apparatus for continuously recording the voltage output of a sensing electrode representative of the partial pressure of a gas in a liquid solution having a voltage input terminal, movable sheet for recording thereon, and recorder pen responsive to a voltage impressed on said input terminal, the improvement comprising, in combination:

valve control means for selectively introducing either a standardized solution or a sample solution to said electrode;

standardizing means for simultaneously operating said valve control means to selectively introduce said standard solution to said electrode and impressing an output voltage from said electrode on said input terminal;

calibrating means for automatically impressing a pre-determined voltage representative of the partial pressure of the gas in said standard solution on said input terminal, means responsive to said calibrating means for automatically storing a compensating voltage representative of the difference between said pre-determined voltage and a voltage generated by said electrode representative of the partial pressure of the gas in said standard solution, measuring means for simultaneously terminating said pre-determined voltage at said input terminal and automatically impressing said compensating voltage across said input in series with a voltage generated by said electrode representative of the partial pressure of a gas in a liquid solution such that said compensating voltage and said electrode voltage in series are more truly representative of the partial pressure of the gas in said liquid solution that is the electrode voltage alone, and means responsive to said measuring means for operating said valve control means to selectively introduce only said sample solution to said electrode.

3. The improvement of claim 2 wherein said calibrating means for automatically impressing said pre-determined voltage comprise a DC power source, a fixed impedance across said power source having an adjustable voltage divider terminal, solenoid actuated switch means for impressing a voltage divided by said voltage divider terminal across said input terminals of said recorder, and manually operable means for energizing said solenoid.

4. The improvement of claim 1 in which said means for automatically storing said compensating voltage comprise a resistive bridge network, a DC power supply for energizing said bridge, a variable impedance in one arm of said bridge, a recorder solenoid, means linked to said solenoid for varying said impedance when said solenoid is energized until said bridge voltage in series with the output of said electrode is substantially equal to said predetermined voltage, and means responsive to said calibrating means for energizing said solenoid when said calibrating means is actuated.

5. In an electronic apparatus for continuously monitoring the voltage output of a sensing electrode representative of the partial pressure of a sample gas in a liquid solution having a voltage input terminal and recorder means for responding to said voltage impressed on said input terminal, the improvement comprising;

sample measuring timer means for breaking a contact a pre-determined sample measuring time after the cycle of said measuring timer means is initiated, means for initiating the cycle of said sample measuring timer means, valve control means for selectively introducing either a standardized gas or a sample gas to said electrode, means responsive to the breaking of said contact for operating said control means to selectively introduce only said standardized gas to said electrode standard measuring timer means responsive to the breaking of said contact for breaking a second contact for a second pre-determined time after the breaking of said first contact, calibration means responsive to the breaking of said second contact for switching the input of said recorder from said electrode voltage to a pre-determined voltage representative of the partial pressure of the standardized gas, means responsive to said calibration means for generating a compensating voltage representative of the difference between said pre-determined voltage and the standardized output of said electrode, means responsive to the breaking of said second contact for operating said valve control means to selectively introduce only said sample gas to said electrode after a third pre-determined time after the breaking of the second contact means responsive to the breaking of said second contact for switching the input of said recorder from said pre-determined voltage to said electrode voltage and said compensating voltage in series, and means responsive to the breaking of said second contact for re-cycling said sample measuring timer means when said second contact is broken.

\* \* \* \* \*

PO-1050
(5/69)

UNITED STATES PATENT OFFICE
CERTIFICATE OF CORRECTION

Patent No. 3,678,375          Dated July 18, 1972

Inventor(s) Otho K. McFarland and James F. Tamburrino

It is certified that error appears in the above-identified patent and that said Letters Patent are hereby corrected as shown below:

IN THE CLAIMS

In claim 5, line 33, delete "for" (second occurrence) and insert -- after --.

IN THE SPECIFICATION

Column 2, line 67, after the word "with" please insert -- and --.

Column 9, line 16, delete "94" and insert -- 194 --.

Column 10, line 51, delete "22" and insert -- 222 --.

Signed and sealed this 13th day of March 1973.

(SEAL)
Attest:

EDWARD M. FLETCHER, JR.
Attesting Officer

ROBERT GOTTSCHALK
Commissioner of Patents